US 6,583,862 B1

(12) United States Patent
Perger

(10) Patent No.: US 6,583,862 B1
(45) Date of Patent: Jun. 24, 2003

(54) COMBINED TELESCOPE AND TELEMETER DEVICE

(76) Inventor: Andreas Perger, Gentzgasse 43, A-1180, Vienna (AT)

( * ) Notice: Subject to any disclaimer, the term of this patent is extended or adjusted under 35 U.S.C. 154(b) by 0 days.

(21) Appl. No.: 10/018,051

(22) PCT Filed: May 17, 2000

(86) PCT No.: PCT/AT00/00136

§ 371 (c)(1),
(2), (4) Date: Dec. 10, 2001

(87) PCT Pub. No.: WO00/77554

PCT Pub. Date: Dec. 21, 2000

(30) Foreign Application Priority Data

Jun. 10, 1999 (AT) .............................................. 1030/99

(51) Int. Cl.[7] ........................ G02B 23/10; G02B 27/32; G02B 23/00; G01B 11/26; G01C 3/08; G01C 1/00
(52) U.S. Cl. .................. 356/4.01; 356/141.1; 356/252; 356/253; 359/399; 359/427; 359/429
(58) Field of Search ............................... 356/4.01–5.15, 356/141.1, 252, 253; 359/399–406, 425, 427, 428, 429; 42/116, 118, 119, 130, 135, 138; 89/41.19

(56) References Cited

U.S. PATENT DOCUMENTS

| 3,698,812 A | * | 10/1972 | Nelson .................... 356/139.08 |
| 3,721,488 A | * | 3/1973 | Kuhne ......................... 356/125 |
| 3,868,169 A | * | 2/1975 | Pfenninger et al. ............. 356/3 |
| 4,108,551 A | * | 8/1978 | Weber ......................... 250/333 |
| 4,116,528 A | * | 9/1978 | Clarke ........................ 313/524 |
| 4,284,326 A | * | 8/1981 | Durrer et al. ................ 359/405 |
| 4,483,587 A | | 11/1984 | Michon et al. ............... 350/174 |
| 4,576,451 A | * | 3/1986 | Tominaga .................... 359/428 |
| 4,611,911 A | | 9/1986 | Kadomatsu ..................... 356/5 |
| 5,022,723 A | * | 6/1991 | Schmidt et al. .............. 359/355 |
| 5,052,801 A | | 10/1991 | Downes, Jr. et al. ........ 356/153 |
| 5,144,479 A | * | 9/1992 | Aharon et al. ............... 356/153 |
| 5,291,263 A | * | 3/1994 | Kong .......................... 356/153 |
| 5,313,409 A | * | 5/1994 | Wiklund et al. ............... 33/290 |
| 5,892,617 A | * | 4/1999 | Wallace ...................... 356/5.01 |
| 6,204,961 B1 | * | 3/2001 | Anderson et al. ........... 359/353 |
| 6,333,783 B1 | * | 12/2001 | Ohishi ........................ 356/4.01 |
| 6,344,894 B1 | * | 2/2002 | Liou .......................... 356/4.01 |
| 6,442,854 B1 | * | 9/2002 | Liu et al. ...................... 33/286 |

FOREIGN PATENT DOCUMENTS

| AT | 402565 | 6/1997 | ............ F41G/3/06 |
| DE | 25 56 673 | 7/1977 | ........... G02B/23/00 |
| DE | 29 24 478 | 1/1980 | ............. G02S/9/62 |
| DE | 42 18 118 | 12/1993 | ............ F41G/1/38 |
| EP | 0165170 | 12/1985 | ............ F41G/3/32 |
| EP | 0709705 | 5/1996 | ........... G02B/23/00 |
| GB | 2187353 | 9/1987 | ........... G01S/17/88 |
| JP | 58102108 | 6/1983 | ............ G01C/3/08 |

* cited by examiner

Primary Examiner—Thomas H. Tarcza
Assistant Examiner—Brian Andrea
(74) Attorney, Agent, or Firm—Karl Hormann

(57) ABSTRACT

The invention relates to a combined telescope and telemeter device comprising a telescopic sight (1) having a housing (2), one end of which receives an objective lens (3) while the other end receives an eyepiece (4), said housing defining a beam path (5) between the objective lens and the eyepiece. The device also includes an opto-electronic telemeter (12) with emitter-receiver optics (14) for optical measuring beams (15) and evaluation electronics (24) for timing the interval between an emitted measuring beam and a received measuring beam and for determining the distance on the basis thereof. The device further comprises a beam splitter (17) in the beam path (5) of the housing (2), which couples and decouples the measuring beams (15) in the part of the beam path (5) extending in the direction of the objective lens (3), wherein the housing (2) has a hole (16) in a side wall and a telemeter (12) is contained in a separate measuring housing (13) but can be mounted in said side wall, wherein the emitter-receiver optics (14) is directed at the above-mentioned hole (16).

16 Claims, 1 Drawing Sheet

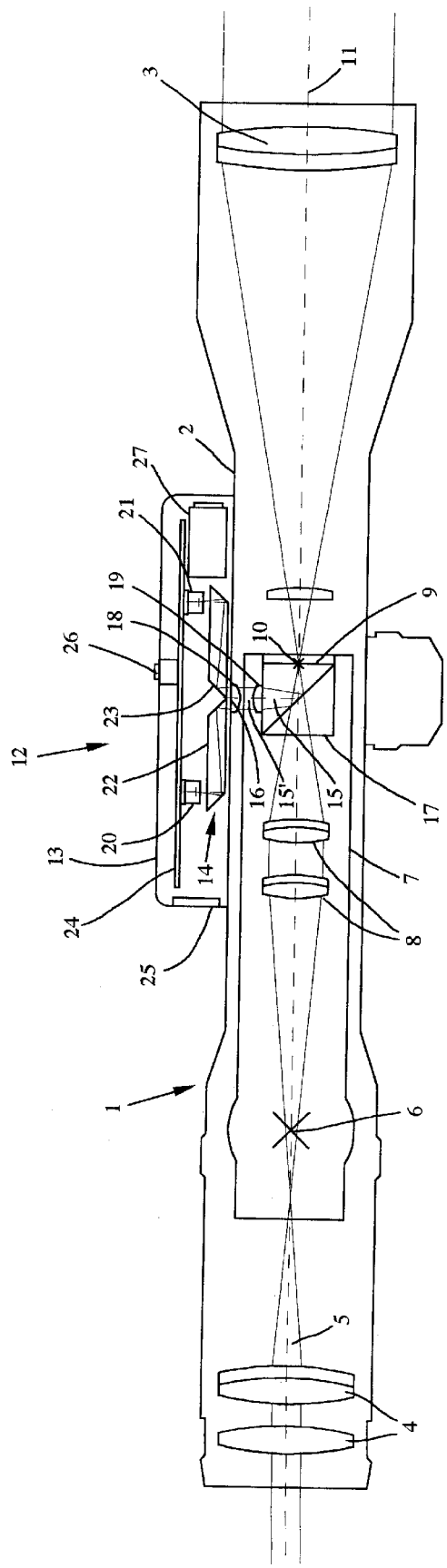

COMBINED TELESCOPE AND TELEMETER DEVICE

BACKGROUND OF THE INVENTION

1. Background of the Invention

The present invention relates to a combination telescope and range finding apparatus, including a telescoping sight provided with a telescope housing one end of which receives an objective lens and the other end of which receives an eyepiece and which defines a beam path therebetween, an opto-electronic range finder provided with emitter-receiver optics for optical measuring beams and evaluation electronics for timing the interval between emission and reception of a measuring beam and for determining the distance on the basis thereof, and a beam splitter within the beam path of the telescope housing for coupling and decoupling measuring beams into the part of the beam path directed toward the objective lens.

Such an apparatus is known, for instance, from European Patent EP 0,709,705. The publication discloses a telescoping sight for fire arms and is provided with a laser range finder integrated into the telescope housing. Emitted and received measuring beams are coupled and decoupled into the beam path toward the objective lens by separate beam splitters. The beam splitters are fixedly supported by the telescope housing, and for adjusting the sighting of the telescope the objective lens is mounted adjustably relative to the housing of the telescoping sight.

On the one hand, such a structure is complex as it requires two separate beam splitters and an adjustable objective lens; on the other hand, it is not possible simply to convert extant telescoping sights, for conventional telescoping sights utilize a movably mounted internal tube containing a target mark and reversal optics; no objective lens is provided which is mounted for special movements.

2. The Prior Art

It is, therefore, an object of the invention to provide a combination telescope and range finder apparatus which may be constructed in a particularly simple manner by conversion of existing telescopes. In an apparatus of the kind referred to supra, the object is accomplished by the an opening provided in a side wall of the telescope housing and the range finder being contained in a separate measuring housing adapted for mounting on said side wall, the emitter-receiver optics being directed toward the said opening.

In this manner, conversion of conventional telescoping sights available in the market is made simple.

In accordance with a preferred embodiment of the invention, the opening is hermetically sealed by a cover which is transparent to measuring beams. In this manner, the telescope is protected from moisture entering and from the possibility of fogging. The telescope remains sealed even in case of a repair.

The invention is particularly suitable for use with such commercially available telescopes in which the telescope housing is provided with an adjustably mounted internal tube of the kind which is traversed by the beam path, renders a target mark and optionally contains reversal optics. In such cases, the invention provides for the beam splitter to be mounted on the internal tube. More particularly, the target mark may be provided, preferably as a hairline graticule, on the side of the beam splitter facing the objective lens. This would require minimum adjustment of a telescoping sight.

In order in such cases to prevent shifting of the focus of the measuring beam coupled into the beam path relative to the target mark as a result of the internal tube being tilted relative to the telescope housing during sighting adjustments, a portion of the section of measuring beams between beam splitter and emitter-receiver optics in accordance with a preferred embodiment of the invention is a focal. This allows for movement of the internal tube relative to the telescope housing without the focus of the measuring beam being shifted in any significant way.

In accordance with the invention, this may be accomplished in a structurally simple and compact manner by each of the telescope housing and the internal tube or the beam splitter supporting a lens or group of lenses which between them form the mentioned focal portion.

In any case, emitter-receiver optics with spatially separated emitting and receiving components provided at their input with a beam splitter for correspondingly splitting of emitted and received measuring beams, is deemed to be particularly advantageous. In this fashion, cross talk from the emitter to the receiver component may be substantially reduced.

In this connection, it is particularly advantageous to structure the beam splitter as two opposing 90° deflector prisms with the mentioned opening aligned centrally thereof. This results in a measuring housing of particularly low structure.

Alternatively, the beam splitter may be a physical beam power splitter, e.g. a 50%/50% splifter, a polarizing splitter, etc., so that both emitted and received measuring beams may each utilize the entire surface of the objective lens.

In accordance with the invention, an especially compact structure of the measuring housing is obtained by arranging the emitter and receiver components axially spaced from each other on a circuit board extending parallel to the axis of the telescope housing.

The invention will be described in greater detail on the basis of an embodiment depicted in the accompanying drawing.

The figure of the drawing schematically depicts a combination telescope and range finder in accordance with the invention apparatus in horizontal longitudinal section.

The combination telescope and range finder apparatus comprises a telescoping sight generally designated 1 provided with a telescope housing 2 one end of which receives an objective lens 3 and the other end of which receives an eyepiece 4 defining between them a beam path 5.

In the interior of the telescope housing 2 there is provided an internal tube 7 mounted for movement about a fulcrum 6 by means not shown in detail. In a manner well-known in technology, internal tube 7, contains a reversal system 8, shown only schematically, as well as, at its forward end, a hairline graticule 9 which presents to observer a target mark 10 at the eyepiece 4. For adjusting the sighting of the telescoping sight, i.e. for adjusting the sight axis 11 relative to the trajectory axis of a fire arm (not shown), the internal tube 7 is pivoted about the fulcrum 6 by adjustment spindles (not shown).

An electro-optical range finder based on laser principles generally designated 12 is mounted on the external wall of the telescope housing 2. The range finder 12 is received in its own measuring housing 13. The measuring housing 13 contains emitter-receiver electronics 14 for laser measuring beams 15 and evaluation electronics for measuring the interval between an emitted and a received measuring beam 15 and for determining the distance derived therefrom.

The emitter-receiver electronics 14 is aimed at an opening 16 formed in the side wall of the telescoping housing 2. The opening 16 is disposed above an output window of a beam splitter 17 arranged in the internal tube 7 for coupling and decoupling measuring beams 15 into the beam path 5 directed towards the objective lens 3.

The beam splitter 17 is disposed at the rear surface of the hairline graticule 9. Alternatively, the target mark 10 may also be formed at the front face of the beam splitter 17.

Movement of the internal tube 7 relative to the telescope housing 2 would result in detrimental movement of the focus of the laser measuring beams 15 occurring at the locus of the target mark 10. The resulting error at aiming for measurement would be about the same as the sighting adjustment, usually 50–100 cm for 100 m of distance.

To prevent this, the measuring beams 15 are conducted a focally at least in a portion 15' of the section extending between the receiving optics 14 and the beam splitter 17. For this purpose there are mounted, in the vicinity of the opening 16 on the one hand and the internal tube 7 or directly on the beam splitter 17 on the other hand, a group of lenses or lens 18, 19, which between them form the a focal portion 15' of the mentioned measuring beam section. In this manner (if the beam is decoupled laterally as shown in the figure) the vertical error is completely eliminated, and the horizontal error is reduced to about one tenth of the sighting adjustment, as a rule about 5–10 cm per 100 m. As regards the distance measurement such residual error is negligible.

In the embodiment shown, the emitter-receiver optics 14 consists of spatially separated separate emitter and receiving components 20, 21 with a beam splitter 22, 23 in front of them to split the measuring beams 15 into emitted and received beams. The emitter and receiver components 20, 21 are arranged on circuit board 24 extending parallel to the axis of the telescope housing 2, the circuit board also supporting the evaluation electronics for timing the interval and determining the distance.

The beam splitter 22, 23 is made up of to opposing Z-deflector prisms aligned centrally relative to the opening 16. In this manner, one half each of the aperture of the lens 3 is associated with the emitter component 20 and with the receiver component 21, thus minimizing cross-talk from the emitter component to the receiving component. Moreover, the depicted prism arrangement makes possible a low structure of the measuring housing 13 and to arrange the evaluation electronics in a single plane.

At its rear side the measuring housing 13 supports a display 25 for showing the measured distance and at its side it button 26 for commencing a measurement. In addition, a battery 27 for powering the range finder is arranged within the measuring housing 13.

Alternatively, the display 25 may be arranged in the interior of the telescope housing 2 or at the margin of the image in the second image plane of the beam path 5. Instead of the geometric beam splitter 22, 23 shown, any other kind of known beam splitter may be used, such as, for instance, a physical beam power splitter, such a 50%/50% splitter, a polarizing splitter, etc. In any case, the entire aperture of the objective lens 3 is associated with the emitter component 20 and the receiver component 21.

The described structure requires only a single additional opening, i.e. opening 16, in the telescope housing 2. The opening 16 may be lastingly sealed by insertion of the lens 18 in a gas-tight manner, so that the interior space of the telescoping sight 1 which is sensitive to fogging is protected from penetration of humidity. Even during repair of the electronics, the telescoping sight remains sealed as the measuring housing 13 only need be removed.

A laser diode range finder operating in a pulse interval method is an especially suitable opto-electronic range finder. Alternatively, any other prior art electro-optical range finding apparatus may be used.

What is claimed is:

1. A combination telescope and range finding apparatus, comprising:
   an elongated telescope housing forming at opposite ends thereof first and second openings to define an optical axis, and a third opening in a side wall thereof;
   an objective lens disposed in one of the first and second openings;
   an eyepiece disposed in the other of the first and second openings;
   an internal tube mounted within the telescope housing for selective pivotal movements relative to the optical axis and providing a target mark visible in the eyepiece;
   a beam path extending between the objective lens and the eyepiece through the internal tube;
   an opto-electronic range finder provided with means for emitting and receiving a measuring beam through the third opening to and from a subject and for determining the distance to the subject as a function of the interval between emission and reception of the measuring beam;
   measuring beam deflection means disposed in the beam path within the internal tube for directing the measuring beam through the third opening and the eyepiece from and to the range finder; and
   means for rendering a focal at least the portion of the measuring beam between the measuring beam deflection means and the range finder.

2. The apparatus of claim 1, wherein the means for rendering the measuring beam a focal comprises at least one lens in at least one of the measuring beam deflection means and the telescope housing.

3. The apparatus of claim 2, wherein the third opening is hermetically sealed by a cover transparent to the measuring beam.

4. The apparatus of claim 3, wherein the cover constitutes the at least one lens.

5. The apparatus of claim 2, wherein the target mark is disposed at a side of the measuring beam deflection means facing the objective lens.

6. The apparatus of claim 5, wherein the target mark comprises a hair-line graticule.

7. The apparatus of claim 2, wherein the range finder comprises spatially separated emitter and receiver components.

8. The apparatus of claim 7, wherein the range finder further comprises a circuit board aligned parallel to the axis of the telescope housing and wherein the emitter and receiver components are mounted in axial alignment at opposite ends of the circuit board.

9. The apparatus of claim 8, wherein the range finder further comprises deflecting means disposed to direct the measuring beam through the third opening from and to the emitter and receiver components into and out of the beam path.

10. The apparatus of claim 9, wherein the deflecting means comprises a pair of 90° deflection prisms disposed on opposite sides of the third opening.

11. The apparatus of claim 9, wherein the deflecting means comprises a physical beam power splitter.

12. The apparatus of claim 11, wherein the beam power splitter is a 50%/50% splitter.

13. The apparatus of claim 9, wherein the deflecting means comprises a polarizing splitter.

14. A telescoping sight adapted to be attached to an opto-electronic range finder of the kind transmitting and receiving a measuring beam for determining the distance to a subject as a function of the interval between transmission and receiption fo the measuring beam, comprising:

an elongated telescope housing forming at opposite ends thereof first and second openings to define an optical axis, and a third opening in a side wall thereof adapted to be aligned with the rangefinder for accommodating the bidirectional passage of a measuring beam;

an objective lens disposed in one of the first and second openings;

an eyepiece disposed in the other of the first and second openings;

an internal tube mounted within the telescope housing for selective pivotal movements relative to the optical axis and providing a target mark visible in the eyepiece;

a beam path extending between the objective lens and the eyepiece through the internal tube;

means supported in the internal tube and disposed in the beam path for deflecting a measuring beam between the third opening and the objective lens; and means in at least one of the third opening and the means for deflecting the measuring beam for rendering the measuring beam afocal.

15. The telescoping sight of claim 14, wherein the third opening is hermetically sealed by a cover transparent to the afocal beam.

16. The telescoping sight of claim 15, wherein the cover comprises a lens.

* * * * *